Sept. 29, 1925.
F. W. HUBER
1,555,801
METHOD OF LOCATING WATER BEARING STRATA IN BORE HOLES
Filed Feb. 17, 1925   4 Sheets-Sheet 3
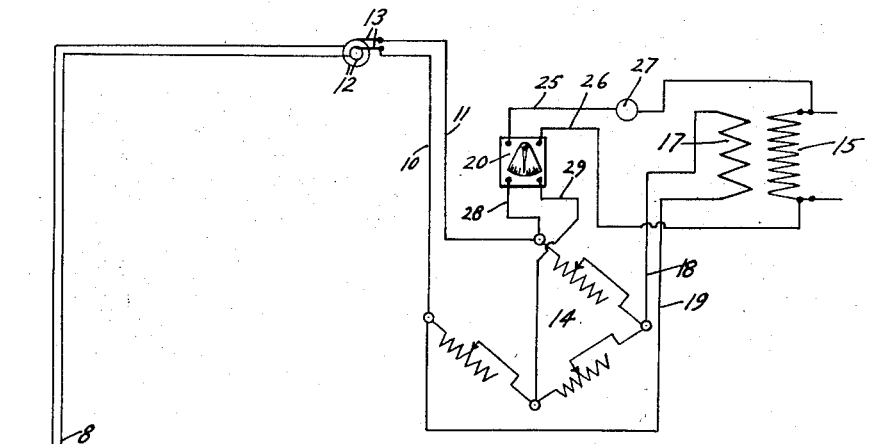
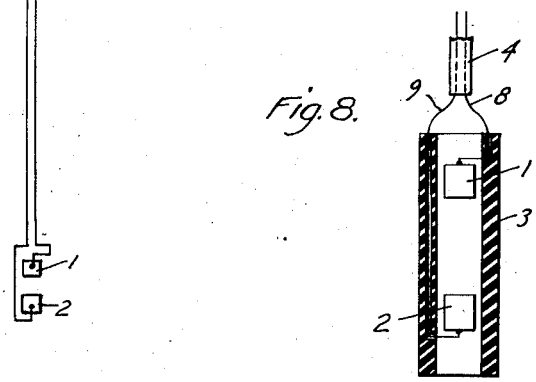
INVENTOR.
Frederick W. Huber
BY Arthur P. Knight
ATTORNEY.

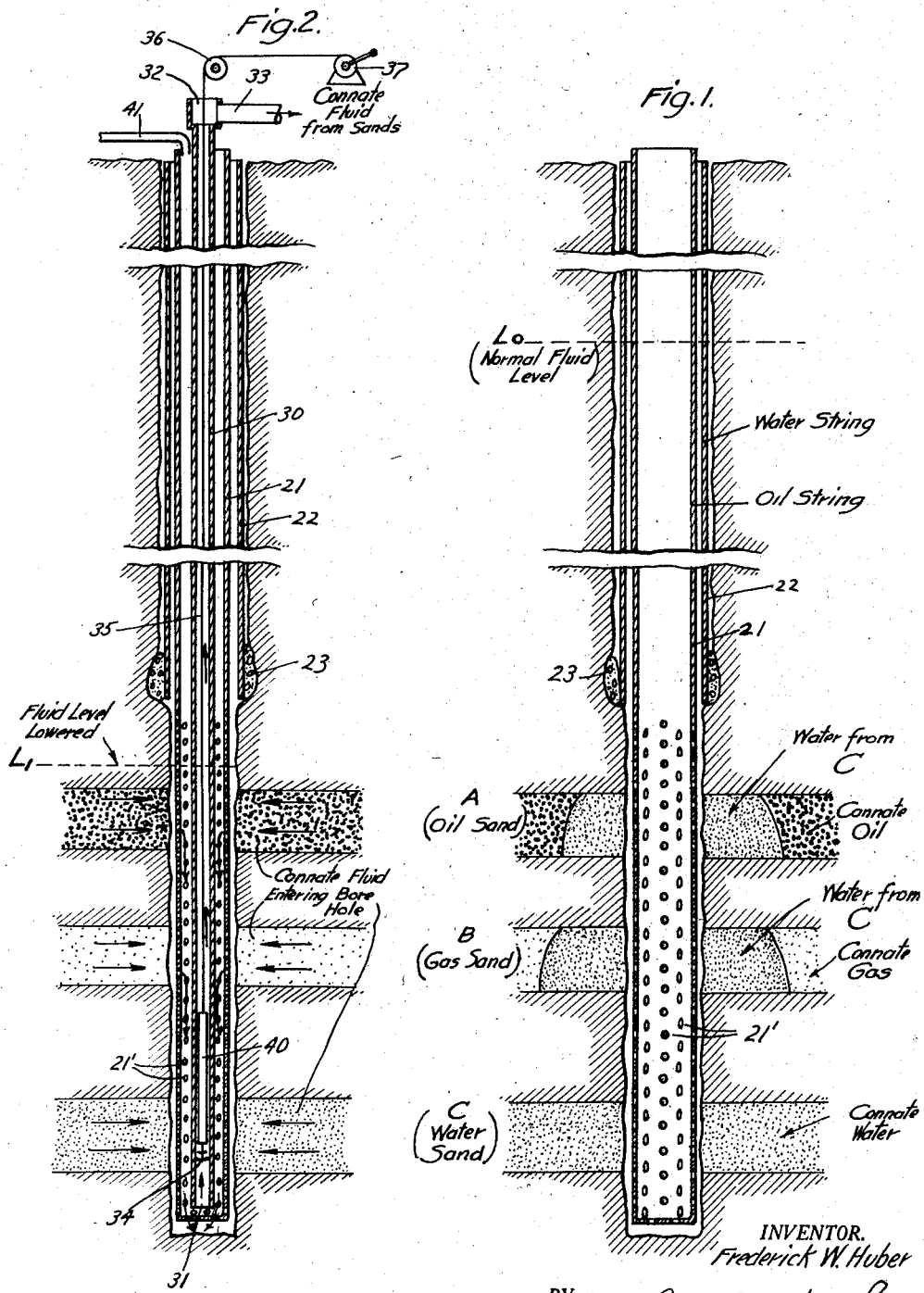

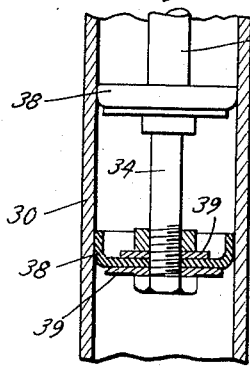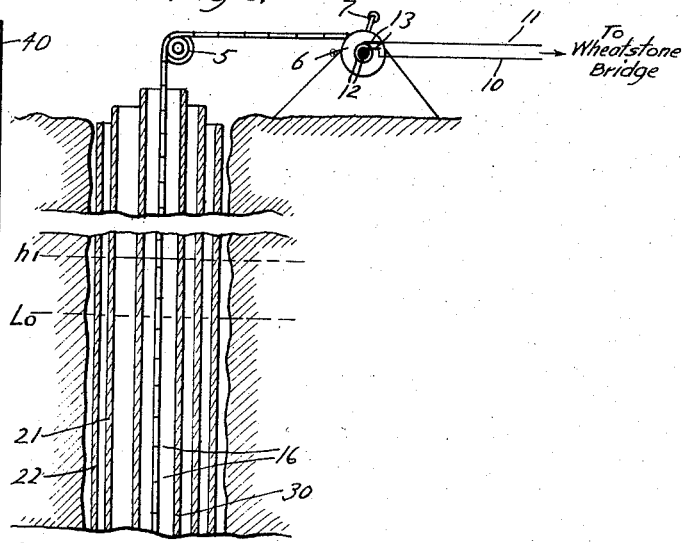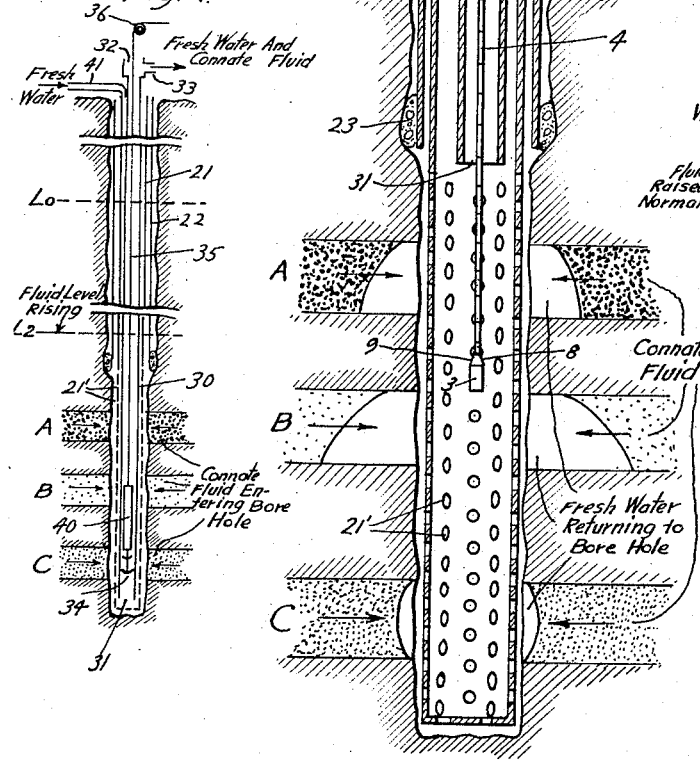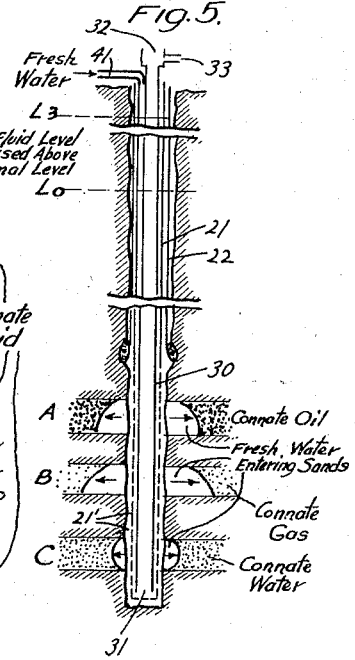

Sept. 29, 1925.
F. W. HUBER
1,555,801
METHOD OF LOCATING WATER BEARING STRATA IN BORE HOLES
Filed Feb. 17, 1925 4 Sheets-Sheet 4
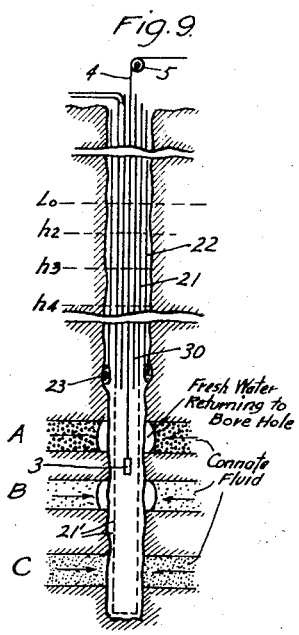
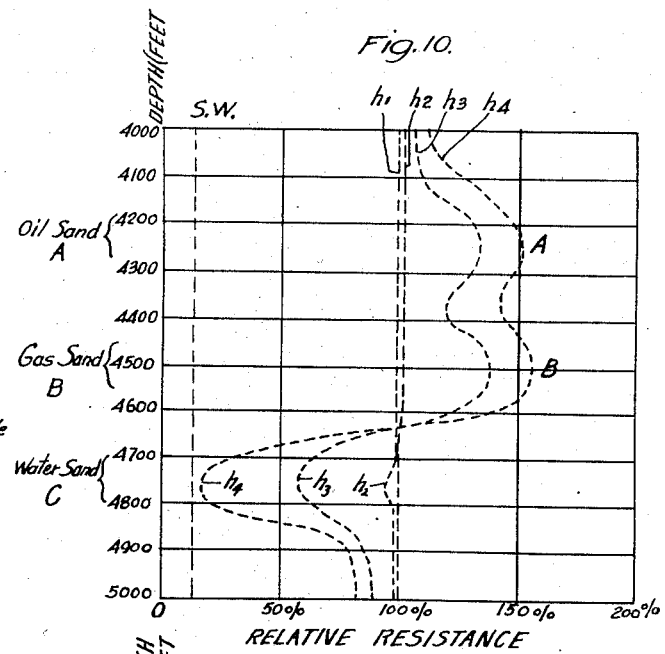
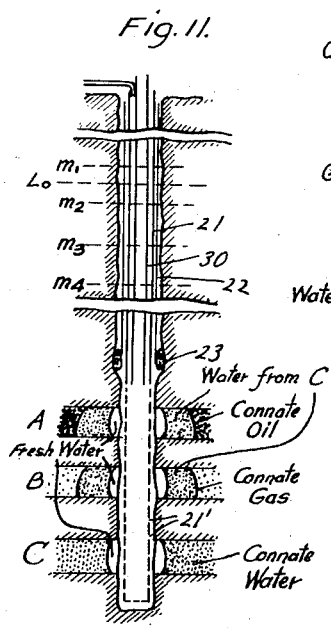
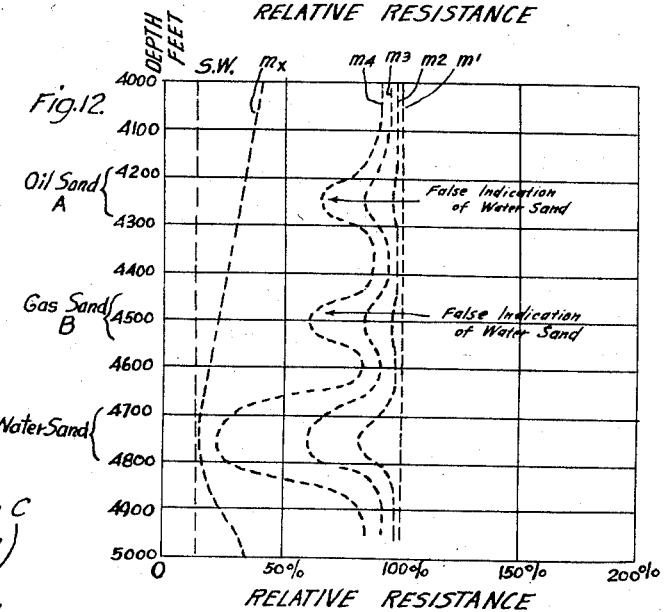
INVENTOR.
Frederick W. Huber,
BY
ATTORNEY.

Patented Sept. 29, 1925.

1,555,801

UNITED STATES PATENT OFFICE.

FREDERICK W. HUBER, OF RIVERSIDE, CALIFORNIA.

METHOD OF LOCATING WATER-BEARING STRATA IN BORE HOLES.

Application filed February 17, 1925. Serial No. 9,861.

*To all whom it may concern:*

Be it known that I, FREDERICK W. HUBER, a citizen of the United States, residing at Riverside, in the county of Riverside, State of California, have invented a new and useful Method of Locating Water-Bearing Strata in Bore Holes, of which the following is a specification.

This invention relates to a method for locating water bearing strata in bore holes in oil or gas bearing formations and the main object of the invention is to provide a means and method whereby the location of such water bearing strata may be positively determined.

A further object of the invention is to prevent false indications of water bearing strata which have occurred with certain other methods of testing, and which might result in cementing off an oil-bearing stratum due to the false indication that the same was a water-bearing stratum. The causes of such false indications and the manner in which they are prevented by the present invention will be described more fully hereinafter.

A further object of the invention is to provide a method whereby the character of the connate fluid in any fluid bearing stratum may be readily and accurately determined, thus locating the position of oil-bearing or gas-bearing sands as well as of water bearing sands.

A more immediate object of the present invention is to so condition the bore hole, that a column of fresh water, or water of less saline concentration than the connate water from the water bearing stratum or strata, is established in the bore hole while each fluid bearing stratum (whether initially containing oil, gas or water) contains only its own connate fluid (with or without some intruded fresh water immediately surrounding the bore hole), so that connate fluid from each stratum may then be caused to enter the bore hole (preceded of course by such intruded fresh water if any is present) and thus establish in the column of fresh water opposite each fluid bearing stratum a zone of connate fluid from such stratum.

In boring wells for oil or gas production, considerable difficulty has arisen from the presence of water bearing strata encountered in the course of drilling or boring of such wells. In order to provide for effective production of petroleum or gas from such wells it is necessary to prevent entrance of water from the water bearing strata to the well casing, this generally being provided for by cementing off the well in an appropriate manner as well understood in the art. In order to provide for effective cementing off of water from the well it is necessary to determine in the first place the location of the water bearing strata and this has been a matter of considerable difficulty, particularly where the wells are drilled or bored in such manner that the bore is filled or partly filled with water or mud during the drilling operation. Under such circumstances the determination of water bearing strata has been a matter of great difficulty, expense, and uncertainty.

The oil-bearing zones in an oil field consist, usually, of alternating strata of oil sand and impermeable shale or clay and sometimes intermediate sands which carry saline water. The oil in the oil bearing sand has at its base a very saline body of water known geologically as "edge water". If an oil or gas bore is made and the water-bearing sand is not sealed off it will allow the water to enter the oil sand and crowd the oil away from the bore and it will be difficult to make the well produce. If production can be obtained the oil will be mixed with water and will have to be de-emulsified. On the other hand supposing there is no intermediate water sand and the well is on production: As the oil is drawn from say one or more sands of the series the edge water will come nearer and nearer the bore until finally it will enter the bore and inundate the oil sands and the production will cease. This case illustrates the problem of a great many oil fields which have been developed too intensely. The locating of the stratum or strata making the difficulty constitutes one of the most serious problems in the oil industry.

My invention obviates this difficulty by providing for positive determination of the location of water-bearing strata by the method hereinafter set forth, said method in its preferred form comprising conditioning the hole very carefully to accomplish the above-described result, and then measuring the electrical conductivity of the liquid in the well at various levels. The method and means used for measuring the electrical conductivity are substantially the same as disclosed in my patent application Serial No. 702,946, filed March 29, 1924, (now Patent No. 1,536,007) but the method of conditioning the bore hole under the present invention is quite different from that described in the said application.

It frequently occurs that in a bore hole into which saline water is entering from a water sand, such water is under a higher head or pressure than the oil or gas from other strata. Therefore if the well is allowed to stand, as is ordinarily done when the well starts to produce water instead of oil, such saline water will not only fill the bore hole to a certain level at which the pressure in the water sand is balanced, but will also intrude a greater or less distance into the oil or gas sands around the bore hole, due to the fact that the head of the column of fluid is greater than the pressure in such oil or gas sands. If, under these conditions, an attempt is made to determine the location of the water sand by simply displacing the column of fluid from the bore hole with fresh water, reducing the head of the resulting column of fresh water, and measuring the electrical conductivity of the fluid in the bore hole at different levels to detect the entrance of saline water into the fresh water at certain points, the intruded saline water from an oil or gas sand may re-enter the bore hole and give a false indication of a water-sand opposite such oil or gas sand. If this sand were cemented off in an attempt to stop the water, the production of oil or gas would be seriously diminished or entirely stopped. Under the present invention such false indications are prevented. The hole is first conditioned by removing fluid therefrom, for example by swabbing, and reducing the fluid level sufficiently to make each sand expel any intruded fluid and also commence to expel its own connate fluid. By connate fluid I mean the fluid native to, or naturally occurring in, a particular stratum or sand. Fresh water is then introduced into the bore hole while the swabbing is continued, thus gradually displacing all fluid in the hole by fresh water and at the same time preventing intrusion into any stratum of any fluid except fresh water, then raising the level of such column of fresh water to or above the normal fluid level, and then reducing the head of the column of fresh water sufficiently to cause first intruded fresh water and then connate fluid from each stratum to enter the column of fresh water. By then making conductivity measurements at different levels in the column of fluid, a true indication may be obtained of the connate fluid entering from each stratum. In order to more accurately locate the water stratum and prevent errors due to temperature conditions I prefer to perform a series of measuring operations on the column of liquid in the bore hole, the liquid being bailed out to a lower level after each measuring operation, the resultant measurements for different heights in the bore hole being plotted so as to give a series of check readings which eliminate accidental abnormalities, thereby giving a true indication of the location of the water bearing strata or stratum.

The accompanying drawings illustrate the method and means by which my invention may be carried out and referring thereto:

Fig. 1 is a diagrammatic vertical section of a bore hole into which water has entered.

Fig. 2 is a similar section showing the means for conditioning the bore hole.

Fig. 3 is a detailed side elevation of the swabbing means.

Figs. 4 and 5 are diagrammatic sections showing further stages in the conditioning of the bore hole.

Fig. 6 is a vertical section of the bore hole with the means for making conductivity measurements inserted therein.

Fig. 7 is a diagram of the circuit connections for the conductivity measuring apparatus.

Fig. 8 is a vertical section of the electrode means for applying the measuring electrical potential to any part of the column of liquid in the bore hole.

Fig. 9 is a diagrammatic section representing further stages of the conductivity measurement.

Fig. 10 represents a curve sheet such as would be made in plotting the resistance of the fluid in the bore hole at different levels.

Fig. 11 is a diagrammatic section illustrating how false indications of water sands may be obtained in a bore hole of the type shown.

Fig. 12 is a curve sheet such as would be obtained in plotting the resistance measurements obtained by the method illustrated in Fig. 11.

In order that my method of locating water bearing strata in bore holes may be properly understood I will first describe certain apparatus or appliances used in making conductivity measurements in connection therewith, in the preferred mode of execution of the process, such appliances being shown in Figs. 6, 7, and 8. The purpose of these appliances is to measure the conductivity of different parts of a liquid column established in the bore hole as hereinafter described and such appliances include electrode means adapted to be exposed in contact with such liquid and means for positioning said electrode means at different heights in the bore hole, circuit means, including a source of current for applying a definite electrical potential difference to said electrodes and means for measuring the current in such circuit means and thereby determining the resistance and hence the character of the liquid present between the said electrodes.

The electrodes indicated at 1 and 2 may be mounted in any suitable manner for example within a cylinder 3 which may be of insulating material, the electrodes in any case being insulated from one another and being mounted at a definite distance apart and the said cylinder being open, and preferably open at both ends, so as to allow free access of liquid to said electrodes. The electrodes 1 and 2 and their supporting and enclosing means 3 are mounted on any suitable flexible suspension means such as a cable 4 which passes over suitable sheave 5 at the top of the bore and is connected to suitable means such as a reel 6 having suitable means such as handle 7 for operating the same to wind the cable on the reel or to unwind it therefrom, to cause ascent or descent of the electrode means in the bore hole. Said cable may be provided with markers 16 whereby it is marked off into convenient lengths for measuring the depth at which the electrode means is located at any particular instant of time or any other suitable means may be provided for indicating such depth. Electric circuit wires indicated at 8 and 9 are connected at their upper ends to wires 10 and 11 forming a part of the electrical measuring circuit as hereinafter described, the connection for the respective wires 8 and 9, and 10 and 11 being, for example, by means of collector rings 12 and brushes 13, so as to admit operation of the reel 6 in raising or lowering the electrode means while maintaining such electric connection. Any suitable circuit means may be provided for applying the electric circuit or potential to the wires leading to the electrodes so as to measure the resistance of the medium presented between the electrodes, for example, as shown in Fig. 3, said electric measuring means may comprise a Wheatstone bridge 14 of usual construction, which is connected to a source of current or electric potential and to the circuit wires 10 and 11. It is essential to the present invention that alternating current should be used in measuring the electrical resistance so as to avoid errors which would result from polarization in case direct current were used, and it is also important that no ground connections should be present, and in order to satisfy these requirements I prefer to use as a source of current a transformer whose primary winding 15 is connected to any suitable alternating current supply circuit, either single phase or polyphase, and whose secondary winding 17 is connected by wires 18 and 19 to opposite terminals of the Wheatstone bridge 14. The intermediate terminals of the Wheatstone bridge are connected in the usual manner to a null point indicator 20 which is of a type adapted for operation by alternating current. Said null point indicator may be provided with energizing circuit connections 25 and 26, including resistance or lamp 27, for the field magnet coil thereof, so as to apply say 110 volts to said coil, to produce a magnetic field which operates upon an armature coil connected by circuit wires 28 and 29 to the intermediate terminals of the Wheatstone bridge in the usual manner of such alternating current measuring means. Any other electrical measuring means, responsive to alternating current, may however be used. The transformer used may be of the iron core type, transforming for example from 110 to 6 volts, the latter voltage being applied to the wires 18 and 19 leading to the end terminals of the Wheatstone bridge, and the circuit connections leading to the electrode means being included in one arm of the Wheatstone bridge in the usual manner of such electrical measuring devices. By maintaining only about 6 volts in the lines leading to the electrodes I ensure operation of the system even when the cable insulation has become damaged by oil or otherwise as long as there is no actual short circuit.

In order that the electrode means shall operate effectively under the conditions existing in the column of liquid in the test operation as hereinafter set forth it is necessary that the surface of the electrodes which are in contact with the liquid not be wetted by oil but only by water and saline solutions. For this purpose I have found it desirable to coat the surface of the metal body or conductors forming the electrodes with a gelatinous substance and I have found that either gelatinous silica or agar may be used advantageously for this purpose. The gelatinous silica is however only applicable to platinum or gold electrodes or to their acid resisting alloys. To coat such an electrode I allow water glass of about 1.15 sp. gr. to harden in a thin film upon the electrode and then immerse it in a very dilute solution of mineral acid, which in the course of a few hours will form a gelatinous coating of silicic acid. This is then washed free of electrolytes and kept in a water saturated atmosphere until ready for use.

With the baser metals such as nickel (which I prefer to use in actual field work) I simply coat the cleaned electrode surface with a thin film of agar dissolved (dispersed) in hot distilled water, by dipping the electrode in the agar infusion and allowing to set, repeating the dipping and setting until a uniform and thin film is obtained over the entire electrode surface. The electrode after the agar has set is kept in water until ready for use. It is also of advantage to first cover the cleaned electrode with a fine cambric cloth and then saturate this cloth with hot agar infusion and build up on this covering a fine glaze of set agar. It is also of advantage, for particularly severe usage, to harden the agar by a hardening agent such as formaldehyde or alum, but this is generally not necessary.

A cambric covered agar coated set of electrodes I have found to be in excellent mechanical and electrical condition after making six round trips to the bottom of a 5000 foot bore hole.

The electrodes so coated with the oil repelling film give in the laboratory when tested against uncoated electrodes practically the same readings instantly. That is it takes but an instant for the electrolyte or rather the ions to penetrate the film.

In addition to the above described apparatus used in making conductivity measurements I will also describe certain apparatus used in conditioning the hole, such apparatus being shown more particularly in Figs. 2, 3, and 4. A string of tubing is indicated at 30 which may be introduced to or near the bottom of the well, said tubing being open at its lower end as at 31 to permit fluid from the well to enter the same and being open at its upper end as at 32 to permit working of the swabbing means therein as hereinafter described. An over-flow pipe 33 is provided at the upper end of said tubing. The swabbing means may comprise a swab indicated at 34 which may be lowered within the tubing 30 by means of cable 35, said cable passing for example over a sheave 36 at the top of the well and being wound on a drum or other means 37 for raising and lowering the cable and swab. Said swab may be of any of the well-known types which are commonly used in the art. A simple form of swab is shown in Fig. 3, comprising one or more flexible rubber gaskets 38 held in place and supported by metal discs 39 but left free at their upturned outer edges. The device may be mounted at the lower end of a rod 40 of sufficient weight to cause lowering of the swab when the cable 35 is released, said rod being attached to the lower end of said cable. The construction of the swab is therefore such that when it is lowered within the tubing fluid is permitted to pass upwardly around it due to flexure of the gaskets 38, but when it is raised such fluid is prevented from passing downwardly therethrough by the checking action of said gaskets due to pressure from above. Alternate raising and lowering of the swabbing means therefore causes fluid to be raised within the tubing 30, an operation which is well-known in oil field practice and which need not be described in further detail here. I also provide means such as pipe 41 for supplying fresh water to the well outside of tubing 30.

As a practical illustration of a method of carrying out my invention for locating water-bearing strata in bore holes using the above described apparatus I may proceed as follows:

In Fig. 1 a bore hole of an oil well is shown diagrammatically, said well being provided with the usual oil string 21 and with the usual water string indicated at 22. The lower portion of the oil string is provided with perforations 21' so that the portion of said oil string opposite the fluid-bearing sands is adapted to permit passage of fluid into the interior thereof. The water string is cemented off in the usual manner as at 23 to seal off water strata surrounding the bore hole above this point and prevent entry of water from such strata into the oil string. Three fluid-bearing sands are indicated, namely, an oil sand at A, a gas sand at B, and a water sand at C. As shown in Fig. 1 the pressure on the connate water in said sand C is greater than the natural pressure of the fluid on sands A and B so that the water from C has not only filled the bore hole to the normal fluid level indicated at $L_0$ but has also penetrated or intruded some little distance into sands A and B as indicated in the diagram. I first determine the normal fluid level $L_0$ in any suitable manner for example by determining the depth to which a cable or other device must be lowered in the well before reaching the level of the fluid. The manner in which this level is determined is unimportant but it is highly essential that it be determined in some manner.

To condition such a bore hole for making conductivity measurements therein, I first proceed as shown in Fig. 2 by inserting therein the tubing 30 and swabbing the well by the use of swabbing means 34 as above described. The fluid level is thus reduced as indicated for example at $L_1$ and fluid is caused to enter the well from sands A, B, and C. The intruder water from sands A and B will first re-enter the well followed by the connate oil and gas from the respective sands. All fluid other than connate fluid is thus removed from each sand or stratum and connate fluid is caused to flow freely into the well from all of said sands. During this procedure the connate fluid travels down from its respective sand to the bottom of the well in order to enter tubing 30. In order to prevent the connate fluid from subsequently rising and again intruding into the weaker sands, I next introduce fresh water into the bore hole between the tubing 30 and oil string 21 through the fresh water supply pipe 41 as indicated in Fig. 4, while continuing the swabbing. During this stage of the operation the swabbing is continued at a greater rate than that at which fresh water is introduced so that a stream of fresh water and connate fluid is caused to be discharged from the well. Connate fluid is thus prevented from rising and entering another sand while the column of fluid in the bore hole is gradually changed from connate fluid to fresh water. During this stage of operation the fluid level may be permitted to rise gradually as indicated at $L_2$. The simultaneous swabbing and introduction of fresh water is continued in this manner until the fluid being discharged through overflow pipe 33 consists principally of fresh water, showing that the connate fluid in the bore hole has been substantially displaced by fresh water. It will be understood that of course at this time some connate fluid will be discharged together with the fresh water due to the continued flow of connate fluid from the sands to the well, the fluid level still being below normal. After a little experience however it is possible to readily determine when the combined swabbing and introduction of fresh water has been continued long enough to substantially replace the column of fluid in the bore hole by fresh water. The hole is therefore now full of substantially fresh water and there is in each sand only its own connate fluid.

The swabbing operation is then stopped while the introduction of fresh water through supply pipe 41 is continued. Swabbing means 34 may therefore be removed as indicated in Fig. 5. The fluid level is now brought well above the normal fluid level as indicated at $L_3$ by introduction of sufficient fresh water so that when the tubing 30 is raised as hereinafter described the level will not fall below the normal fluid level. At the time of maximum fluid level the head in all of the sands A, B, and C will be overbalanced and fresh water will therefore be caused to enter to a greater or less distance into such sands as indicated in Fig. 5, forcing the connate fluid further back into the sand. The position of the fluid level may be conveniently determined during this stage of the operation by lowering the conductivity determining electrode means 3 within tubing 30, with the resistance on the Wheatstone bridge set at a value greater than the resistance of fresh water. As long as the electrode means are above the fluid level the resistance of air will be interposed between the electrodes 1 and 2 and the galvanometer will be deflected in one direction. As soon as the electrode means enters the column of water however the resistance between the electrodes will decrease below the resistance set on the Wheatstone bridge and the galvanometer deflection will therefore be reversed.

The string of tubing 30 is then raised, the upper portions of such tubing being of course removed as they are raised, until the lower end of such tubing is approximately even with the top of the perforated portion of the oil string 21 as indicated in Fig. 6. The fluid level should then be brought to a position slightly above the normal fluid level for example to the level $h_1$ in Fig. 6. For this purpose it may be necessary to remove some water from the well by bailing in the usual manner. The properly connected electrode means as above described is now lowered by means of the reel 6 into the interior of the perforated portion of the oil string 21 and the resistance is kept balanced by the Wheatstone bridge for each suitable interval of depth as indicated by the markers 16. The value of the resistance of each reading is recorded and this operation is continued until the bottom of the hole is reached. The electrode means may then be pulled up and reversed readings are or may be taken at the various points as a check. These results are plotted for example as shown at $h_1$ in Fig. 10. Inasmuch as the head of the fluid in all the fluid-bearing strata is slightly overbalanced by the water column in the bore hole at this time there should be little if any entrance of connate fluid into the bore hole and the result of this first series of measurements will therefore produce substantially a straight line. In some cases, however there may be some diffusion of connate fluid from one or more of the strata into the bore hole under these conditions which will give a slight indication of variation in conductivity of the water at such level, and cause slight corresponding curves in the line $h_1$. The resistance of the solution between the electrodes may be measured and plotted in any suitable units or as shown in Fig. 10 such resistance may be conveniently plotted as relative resistance, any convenient resistance for example the resistance between the electrodes of the fresh water used in washing out the bore hole, being taken as an arbitrary 100% resistance. The line $h_1$ will therefore substantially coincide with the line on the chart indicating 100% relative resistance. I also prefer to plot on the same chart a line indicating the relative resistance of saline water occurring in the bore hole, this line being indicated at S. W. in Fig. 10.

After the first series of conductivity measurements I next reduce the fluid level, for example by bailing, to a point just below the normal fluid level for example to the level $h_2$ in Fig. 9. Another series of conductivity measurements are taken as above described and plotted against the depth in the same manner, the line thus obtained being indicated for example at $h_2$ in Fig. 10. As may be seen from Figs. 9 and 10 connate fluid from sand C has at this time begun to enter the bore hole and has increased the conductivity of the water at this point. The successive reductions in the fluid level and conductivity measurements are repeated until the peak in the curve at C approaches the line S. W. These successive readings may be taken for example with the fluid level at $h_3$ and $h_4$ and the curves $h_3$ and $h_4$ thus obtained on the chart in Fig. 10. The results clearly indicate the occurrence of a strong water sand at C due to the marked reduction in the resistance of the column of water at this point. On the other hand if the connate fluid from any sand is oil or gas the resistance of the column of fluid opposite the sand undergoes a marked increase as soon as such connate fluid begins to enter the bore hole as indicated at A and B in Fig. 10.

Figs. 11 and 12 indicate diagrammatically the misleading results which would be obtained in making conductivity measurements in the above described bore hole without first properly conditioning the hole as above described. For example as shown in Fig. 11 if no attempt is made to first remove fluid from the bore hole so as to cause intruded fluid and then connate fluid to flow from each sand into the bore before introduction of fresh water, the intruded water from sand C will be retained in sands A and B and will be pushed further back in such sands by the fresh water introduced into the bore hole. If successive series of conductivity measurements are then taken with the fluid at the same levels as before for example at the levels $m_1$ to $m_4$ inclusive and the results plotted in the same manner, the curves $m_1$ to $m_4$ inclusive will be obtained. This is due to the re-entry of the intruded saline water from sand C into the bore hole opposite sands A and B upon the lowering of the fluid level, thus giving a false indication of water sands at these levels. It is true that eventually such intruded saline water would be entirely displaced from the sands A and B and the true connate fluid from such sands would then enter the bore hole but it has been found in practice that before this occurs the saline water from the strong water sand C will rise in the water column and so increase the conductivity of the entire column as to completely mask any indication of oil or gas opposite the sands A and B, thus giving for example the type of curve indicated at $m_x$ in Fig. 12. It will be seen therefore that if such a method of determination were used the results would be misleading since the conclusion would be that sands A, B, and C were all water sands. If such sands were then cemented off to stop the entrance of water into the well the entire production of oil or gas would be stopped.

The essential and novel feature of my present invention therefore consists in so conditioning the bore hole that the true character of the connate fluid of any stratum may be accurately indicated by conductivity measurements. This is accomplished as above described by swabbing the hole to remove fluid from it and to make the various sands discharge any intruded fluid and also discharge connate fluid into the hole, then introducing fresh water and continuing the swabbing operation in such manner as to gradually displace the connate fluid from the bore hole by fresh water and at the same time prevent intrusion of fluid from one stratum into another stratum, then raising the level of the column of fresh water to or above the normal fluid level so as to permit only fresh water to enter any stratum from the bore hole and then lowering the fluid level in easy stages below the normal fluid level and measuring the conductivity of the fluid at different depths in order to indicate the entry of connate fluid from any stratum into the bore hole such entry of fluid being due either to actual flow or to diffusion or both. It should be borne in mind however that the above described method of procedure is applicable only to wells other than flowing wells, that is, to wells which do not flow fluid under sufficient pressure to carry such fluid up to and above the ground level.

No claim is made herein to the apparatus described and illustrated in the present application, such apparatus being included within the scope of the claims on my copending application 735,330 filed September 2, 1924.

No claim is made herein to the electrode means, the same being claimed in a copending application 756,156, filed December 15, 1924.

What I claim is:

1. The method of locating fluid bearing strata in bore holes which consists in determining the normal fluid level in the bore hole, removing fluid from the bore hole sufficiently to cause the fluid-bearing strata to discharge any intruded fluid into the bore hole and to also discharge connate fluid into the bore hole, displacing such connate fluid from the bore hole by fresh water and continuing to supply fresh water to the bore hole to bring the fluid level above normal fluid level, and then making several successive series of electrical conductivity measurements in the fluid at different depths in the bore hole and lowering the fluid level by stages between each successive series of measurements, so as to determine the depth at which connate fluid of different conductivity than the fresh water in the bore hole enters such fresh water.

2. The method of locating water bearing strata in bore holes which consists in determining the normal fluid level in the bore hole, removing fluid from the bore hole so as to lower the fluid in the well to below the normal level and cause fluid bearing strata other than water strata to discharge any intruded water-bearing from a water stratum into the bore hole and to also discharge connate fluid into the bore hole, displacing the connate fluid from the bore hole by fresh water while preventing intrusion of connate water from a water-bearing stratum into other strata, raising the level of the column of fresh water thus produced above the normal fluid level, and then making successive series of electrical conductivity measurements at different depths in the bore hole while lowering the fluid level by stages between such successive series of measurements so as to determine the depth at which connate water from a water-bearing stratum enters the column of fresh water.

3. The method of conditioning a bore hole for locating fluid-bearing strata therein by methods involving electrical conductivity measurements, which comprises determining the normal fluid level in the bore hole, removing fluid therefrom to cause fluid-bearing strata to discharge intruded fluid and also discharge connate fluid into the bore hole, displacing the fluid thus discharged from the bore hole by fresh water so as to establish in the bore hole a column of fresh water and prevent intrusion of connate fluid from one stratum into another stratum, then raising the level of such column of fresh water above the normal fluid level to prevent connate fluid from entering said column of fresh water, and then lowering the fluid level sufficiently below normal fluid level to cause connate fluid to enter the bore hole.

4. The method of conditioning a bore hole for locating fluid-bearing strata therein by methods involving electrical conductivity measurements therein which comprises determining the normal fluid level in the bore hole, removing fluid from the bottom of the bore hole so as to reduce the fluid level and cause fluid bearing strata to discharge connate fluid into the bore hole, introducing fresh water into the upper part of the bore hole while continuing to remove fluid from the bottom at a faster rate than such fresh water is introduced so as to replace the fluid in the bore hole with fresh water and prevent connate fluid from one stratum from intruding into another stratum, continuing this operation until a column of substantially fresh water is established in the bore hole, then discontinuing the removal of the fluid from the bore hole and continuing to supply fresh water thereto to raise the fluid level above the normal fluid level.

5. The method of conditioning bore holes extending through a plurality of fluid-bearing strata for location of such fluid bearing strata by methods involving electrical conductivity measurements which comprise removing fluid from the bore hole in sufficient amount to cause the several strata to discharge connate fluid, displacing such connate fluid by fresh water and establishing in the bore hole a column of fresh water of sufficient head to balance the pressure of the connate fluid in said strata while preventing connate fluid from one stratum from intruding into any other stratum, and then lowering the height of the column of fresh water sufficiently to cause connate fluid from the several strata to enter said column of fresh water.

6. The method of conditioning bore holes which extend through a plurality of fluid-bearing strata for location of water-bearing strata by methods involving electrical conductivity measurements which comprise removing fluid from the bore hole in sufficient amount to cause the several strata to discharge connate fluid into the bore hole, displacing connate fluid from the bore hole by fresh water and establishing a column of fresh water in the bore hole of sufficient height to balance the fluid pressure in said strata while preventing intrusion of connate water from a water-bearing stratum into another fluid bearing stratum, and then reducing the height of said column of fresh water sufficiently to cause a water stratum to discharge connate water into said column of fresh water.

7. A mode of conditioning a bore hole extending through a plurality of fluid-bearing strata, for testing, which comprises determining the normal fluid level of said hole, removing liquid from said hole to a level below said normal fluid level, then introducing water of known salinity substantially different from the natural salinity of the connate water, into said bore hole, while removing substantially all of the connate fluid from said well, while the liquid level in said hole is kept below the normal liquid level thereof, whereby connate water is substantially prevented from entering oil-bearing and gas bearing strata.

8. A method of conditioning a bore hole for testing by a method involving electrical conductivity measurements which comprises causing the various strata to discharge connate fluids carried by them into the well, by removing liquid from the lower part of the well, continuing to remove liquid from the lower part of the well and simultaneously introducing at the upper part of the well, aqueous liquid of known salinity different from that of the water coming from the water-bearing strata, and continuing this operation until the connate liquid in the well is displaced by such introduced aqueous liquid, then increasing the rate of introduction of said aqueous liquid and continuing such introduction until the liquid in the well rises to above the normal fluid level of the well, and then discontinuing such introduction and withdrawal of liquids.

In testimony whereof I have hereunto subscribed my name this 6th day of February 1925.

FREDERICK W. HUBER.